(12) United States Patent
Kavas Torris et al.

(10) Patent No.: US 12,741,639 B2
(45) Date of Patent: Sep. 22, 2026

(54) ADAPTIVE CRUISE CONTROL

(71) Applicant: Ford Global Technologies, LLC, Dearborn, MI (US)

(72) Inventors: Ozgenur Kavas Torris, Dearborn, MI (US); Brandon M. Dawson, Bloomfield Hills, MI (US); Xiaolin Cai, Sunnyvale, CA (US); Yan Wang, Ann Arbor, MI (US); Mohammad Reza Amini, Ann Arbor, MI (US); Erol Dogan Sumer, Ann Arbor, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 161 days.

(21) Appl. No.: 18/660,405

(22) Filed: May 10, 2024

(65) Prior Publication Data

US 2025/0346228 A1 Nov. 13, 2025

(51) Int. Cl.
*B60W 30/14* (2006.01)

(52) U.S. Cl.
CPC ....... *B60W 30/143* (2013.01); *B60W 2555/00* (2020.02)

(58) Field of Classification Search
CPC ........... B60W 30/143; B60W 2555/00; B60W 2554/804; B60W 2720/106; B60W 30/18163; B60W 30/16; B60W 2520/10; B60W 2554/80; B60W 2720/10; B60W 2556/50; B60W 60/0015; B60W 40/04; B60W 30/162; B60W 30/146; B60W 30/14; G05D 1/0223
See application file for complete search history.

(56) References Cited

U.S. PATENT DOCUMENTS 9,067,603 B2 6/2015 Kolberg et al.
2002/0055808 A1* 5/2002 Matsumoto .......... G01C 21/365 348/148

(Continued)

FOREIGN PATENT DOCUMENTS

CN 115667039 A * 1/2023 ........ B60W 50/0097
DE 102022126329 A1 * 7/2023 ........... G08G 1/0104
JP 2007153080 A * 6/2007

OTHER PUBLICATIONS

Chae, H., et al., "Virtual Target-Based Overtaking Decision, Motion Planning, and Control of Autonomous Vehicles," IEEE Access, Mar. 24, 2020, 14 pages.

*Primary Examiner* — Abby Lin
*Assistant Examiner* — Kayla R Doros
(74) *Attorney, Agent, or Firm* — Frank A. Mackenzie; Brooks Kushman P.C.

(57) ABSTRACT

While operating a host vehicle in a lane of a road, a target vehicle operating in the lane in front of the host vehicle is represented with a virtual vehicle. Upon receiving, from an infrastructure element, operation data describing vehicle operation for the road, acceleration of the target vehicle is predicted based on the operation data. An adjustment to a speed for the virtual vehicle is determined based on the acceleration. The virtual vehicle is updated based on the adjustment to the speed. Upon determining that the virtual vehicle is between the target vehicle and the host vehicle, the host vehicle is operated based on the virtual vehicle.

20 Claims, 9 Drawing Sheets

(56) References Cited

U.S. PATENT DOCUMENTS

2014/0005906 A1* 1/2014 Pandita ................. B60W 30/17 706/46
2019/0009784 A1* 1/2019 Takeda ............ B60W 30/18154
2020/0290611 A1 9/2020 Tang et al.
2021/0061278 A1* 3/2021 Zhao .................. G01C 21/3492
2022/0363254 A1* 11/2022 Baek ........................ H04W 4/02
2023/0031030 A1 2/2023 Park et al.
2023/0083645 A1 3/2023 Zeiynali Farid et al.
2023/0139003 A1* 5/2023 Bhasme .................. B60L 58/16 701/533
2023/0316910 A1 10/2023 Kim
2024/0132066 A1* 4/2024 Vosahlik ............. B60W 40/105

* cited by examiner

ADAPTIVE CRUISE CONTROL

BACKGROUND

A vehicle can be equipped with electronic and electromechanical components, e.g., computing devices, networks, sensors and controllers, etc. A vehicle computer can acquire data regarding the vehicle's environment and can operate the vehicle or at least some components thereof based on the data. Vehicle sensors can provide data concerning routes to be traveled and objects to be accounted for in the vehicle's environment. For example, in a cruise control or adaptive cruise control feature, a vehicle speed can be set and maintained according to user input and/or based on a speed and/or relative position of a reference vehicle, typically an immediately preceding vehicle.

DETAILED DESCRIPTION

Figure 1:
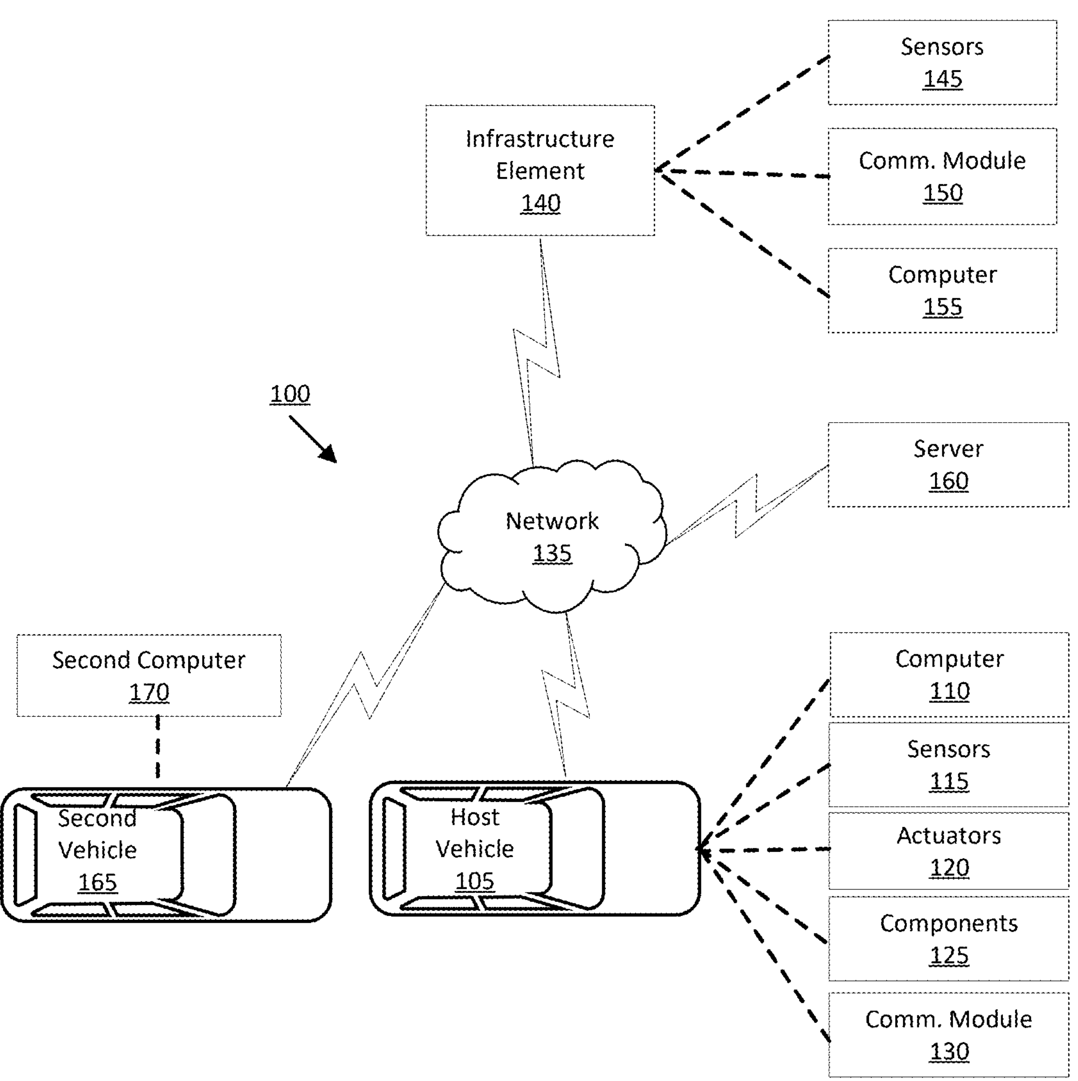
FIG. 1 is a block diagram illustrating an example vehicle control system.

A system includes a computer including a processor and a memory, the memory storing instructions executable by the processor to, while operating a host vehicle in a lane of a road, represent a target vehicle operating in the lane in front of the host vehicle with a virtual vehicle. The instructions further include instructions to, upon receiving, from an infrastructure element, operation data describing vehicle operation for the road, predict acceleration of the target vehicle based on the operation data. The instructions further include instructions to determine an adjustment to a speed for the virtual vehicle based on the acceleration. The instructions further include instructions to update the virtual vehicle based on the adjustment to the speed. The instructions further include instructions to, upon determining that the virtual vehicle is between the target vehicle and the host vehicle, operate the host vehicle based on the virtual vehicle.

The instructions can further include instructions to, upon determining that the target vehicle is between the host vehicle and the virtual vehicle, operate the host vehicle based on the target vehicle.

The instructions can further include instructions to, upon determining an absence of the target vehicle, operate the host vehicle based on a pre-set vehicle speed.

The instructions can further include instructions to, upon determining an absence of the target vehicle, determine that the host vehicle is operating within an area of the road, wherein the operation data describing vehicle operation within the area differs from the operation data describing vehicle operation outside the area.

The instructions can further include instructions to determine one of a presence and an absence of a stop area for the host vehicle within the area based on the operation data.

The instructions can further include instructions to, upon determining the presence of the stop area, determine the adjustment to the speed for the virtual vehicle based on a distance between the host vehicle and a location of the stop area. The instructions can further include instructions to represent the virtual vehicle in the lane based on the adjustment to the speed. The instructions can further include instructions to operate the host vehicle based on the virtual vehicle.

The instructions can further include instructions to, upon determining the absence of the stop area, operate the host vehicle based on a pre-set vehicle speed.

The instructions can further include instructions to determine one of a presence and an absence of a speed reduction area for the host vehicle within the area based on the operation data.

The instructions can further include instructions to, upon determining the presence of the speed reduction area, determine the adjustment to the speed for the virtual vehicle based on a distance between the host vehicle and a location of the speed reduction area and a reduced speed associated with the speed reduction area. The instructions can further include instructions to represent the virtual vehicle in the lane based on the adjustment to the speed. The instructions can further include instructions to operate the host vehicle based on the virtual vehicle.

The instructions can further include instructions to, upon determining the absence of the speed reduction area, operate the host vehicle based on a pre-set vehicle speed.

The instructions can further include instructions to, upon determining an absence of the target vehicle, determine one of a presence and an absence of a stationary object in the lane in front of the host vehicle.

The instructions can further include instructions to, upon determining the presence of the stationary object, determine the adjustment to the speed for the virtual vehicle based on a distance between the host vehicle and a location of the stationary object. The instructions can further include instructions to represent the virtual vehicle in the lane based on the adjustment to the speed. The instructions can further include instructions to operate the host vehicle based on the virtual vehicle.

The instructions can further include instructions to, upon determining the absence of the stationary object, operate the host vehicle based on a pre-set vehicle speed.

A method includes, while operating a host vehicle in a lane of a road, representing a target vehicle operating in the lane in front of the host vehicle with a virtual vehicle. The method further includes, upon receiving, from an infrastructure element, operation data describing vehicle operation for the road, predicting acceleration of the target vehicle based on the operation data. The method further includes determining an adjustment to a speed for the virtual vehicle based on the acceleration. The method further includes updating the virtual vehicle based on the adjustment to the speed. The method further includes, upon determining that the virtual vehicle is between the target vehicle and the host vehicle, operating the host vehicle based on the virtual vehicle.

The method can further include, upon determining that the target vehicle is between the host vehicle and the virtual vehicle, operating the host vehicle based on the target vehicle.

The method can further include, upon determining an absence of the target vehicle, operating the host vehicle based on a pre-set vehicle speed.

The method can further include, upon determining an absence of the target vehicle, determine that the host vehicle is operating within an area of the road, wherein the operation data describing vehicle operation within the area differs from the operation data describing vehicle operation outside the area.

The method can further include determining one of a presence and an absence of a stop area for the host vehicle within the area based on the operation data. The method can further include, upon determining the presence of the stop area, determining the adjustment to the speed for the virtual vehicle based on a distance between the host vehicle and a location of the stop area. The method can further include representing the virtual vehicle in the lane based on the adjustment to the speed. The method can further include operating the host vehicle based on the virtual vehicle. The method can further include, upon determining the absence of the stop area, operating the host vehicle based on a pre-set vehicle speed.

The method can further include determining one of a presence and an absence of a speed reduction area for the host vehicle within the area based on the operation data. The method can further include upon determining the absence of the speed reduction area, operating the host vehicle based on a pre-set vehicle speed. The method can further include, upon determining the presence of the speed reduction area, determining the adjustment to the speed for the virtual vehicle based on a distance between the host vehicle and a location of the speed reduction area and a reduced speed associated with the speed reduction area. The method can further include representing the virtual vehicle in the lane based on the adjustment to the speed. The method can further include operating the host vehicle based on the virtual vehicle.

The method can further include, upon determining an absence of the target vehicle, determining one of a presence and an absence of a stationary object in the lane in front of the host vehicle. The method can further include, upon determining the presence of the stationary object, determining the adjustment to the speed for the virtual vehicle based on a distance between the host vehicle and a location of the stationary object. The method can further include representing the virtual vehicle in the lane based on the adjustment to the speed. The method can further include operating the host vehicle based on the virtual vehicle. The method can further include, upon determining the absence of the stationary object, operating the host vehicle based on a pre-set vehicle speed.

Further disclosed herein is a computing device programmed to execute any of the above method steps. Yet further disclosed herein is a computer program product, including a computer readable medium storing instructions executable by a computer processor, to execute an of the above method steps.

A host vehicle can include an adaptive cruise control system to control a speed of the host vehicle. In an adaptive cruise control system, a vehicle computer can maintain or adjust the speed of the host vehicle based on, e.g., a speed and relative position of a lead vehicle in front of the host vehicle. For example, the vehicle computer can actuate a braking component to reduce the speed of the host vehicle when the lead vehicle decelerates and/or is within a specified distance of the host vehicle. As another example, the vehicle computer can actuate a propulsion component to increase the speed of the host vehicle when the lead vehicle accelerates and/or is outside of the specified distance of the host vehicle. However, adjusting the speed of the host vehicle in response to changes in the lead vehicle operation, i.e., acceleration (i.e., positive acceleration) or deceleration (i.e., negative acceleration) of the lead vehicle, can result in, e.g., acceleration or deceleration that is greater than comfortable for a vehicle occupant and/or that is inefficient for operating a host vehicle, to adjust the host vehicle speed to a pre-set speed.

As described herein, the vehicle computer can determine an adjusted speed for a virtual vehicle associated with a target vehicle operating in front of a host vehicle in a lane based on predicted acceleration for the target vehicle. By determining the adjusted speed for the virtual vehicle, the vehicle computer can control the host vehicle based on the predicted acceleration for the target vehicle, which can reduce and/or smooth acceleration of the host vehicle.

With reference to FIGS. 1-4B, an example vehicle control system 100 includes a host vehicle 105. A vehicle computer 110 in the host vehicle 105 receives data from sensors 115. The vehicle computer 110 is programmed to, while operating a host vehicle 105 in a lane 215 of a road 210, represent a target vehicle 165 operating in the lane 215 in front of the host vehicle 165 with a virtual vehicle 300. The vehicle computer 110 is further programmed to, upon receiving, from an infrastructure element 145, operation data describing vehicle operation for the road 210, predict acceleration of the target vehicle 165 based on the operation data. The vehicle computer 110 is further programmed to determine an adjustment to a speed for the virtual vehicle 300 based on the acceleration. The vehicle computer 110 is further programmed to update the virtual vehicle 300 based on the adjustment to the speed. The vehicle computer 110 is further programmed to, upon determining that the virtual vehicle 300 is between the target vehicle 165 and the host vehicle 105, operate the host vehicle 105 based on the virtual vehicle 300, e.g., to maintain an operating distance (as described below) between the virtual vehicle 300 and the host vehicle 105.

Turning now to FIG. 1, the host vehicle 105 includes the vehicle computer 110, sensors 115, actuators 120 to actuate various vehicle components 125, and a vehicle communications module 130. The communications module 130 allows the vehicle computer 110 to communicate with a remote server computer 160, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out host vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may include programming to operate one or more of host vehicle 105 brakes, propulsion (e.g., control of acceleration in the host vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the host vehicle 105 for monitoring and/or controlling various vehicle components 125, e.g., a transmission controller, a brake controller, a steering controller, etc. The vehicle computer 110 is generally arranged for communications on a vehicle communication network that can include a bus in the host vehicle 105 such as a controller area network (CAN) or the like, and/or other wired and/or wireless mechanisms.

Via the host vehicle 105 network, the vehicle computer 110 may transmit messages to various devices in the host vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the host vehicle 105, behind a host vehicle 105 front windshield, around the host vehicle 105, etc., that provide relative locations, sizes, and shapes of objects surrounding the host vehicle 105. As another example, one or more radar sensors 115 fixed to host vehicle 105 bumpers may provide data to provide locations of the objects, second vehicles, etc., relative to the location of the host vehicle 105. The sensors 115 may further alternatively or additionally, for example, include camera sensor(s) 115, e.g. front view, side view, etc., providing images from an area surrounding the host vehicle 105. In the context of this disclosure, an object is a physical, i.e., material, item that has mass and that can be represented by physical phenomena (e.g., light or other electromagnetic waves, or sound, etc.) detectable by sensors 115. Thus, the host vehicle 105, as well as other items including as discussed below, fall within the definition of "object" herein.

The vehicle computer 110 is programmed to receive data from one or more sensors 115 substantially continuously, periodically, and/or when instructed by a remote server computer 160, etc. The data may, for example, include a location of the host vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the host vehicle 105. As one example, the data may be image data of the environment around the host vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the host vehicle 105 to collect images of the environment around the host vehicle 105.

The host vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a host vehicle 105.

In the context of the present disclosure, a vehicle component 125 is one or more hardware components adapted to perform a mechanical or electro-mechanical function or operation-such as moving the host vehicle 105, slowing or stopping the host vehicle 105, steering the host vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, etc.

In addition, the vehicle computer 110 may be configured for communicating via a vehicle-to-vehicle communication module 130 or interface with devices outside of the host vehicle 105, e.g., through a vehicle-to-vehicle (V2V) or vehicle-to-infrastructure (V2X) wireless communications (cellular and/or short-range radio communications, etc.) to another vehicle, and/or to a remote server computer 160 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), cellular V2X (CV2X), and/or wide area networks (WAN), including the Internet, providing data communication services. The label "V2X" is used herein for communications that may be vehicle-to-vehicle (V2V) and/or vehicle-to-infrastructure (V2I), and that may be provided by communication module 130 according to any suitable short-range communications mechanism, e.g., DSRC, cellular, or the like.

The network 135 represents one or more mechanisms by which a vehicle computer 110 may communicate with remote computing devices, e.g., the remote server computer 160, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

An infrastructure element 140 includes a physical structure such as a tower or other support structure (e.g., a pole, a box mountable to a bridge support, cell phone tower, road sign support, etc.) on or in which infrastructure sensors 145, as well as an infrastructure communications module 150 and computer 155 can be housed, mounted, stored, and/or contained, and powered, etc. One infrastructure element 140 is shown in FIG. 1 for ease of illustration, but the system 100 could and likely would include tens, hundreds, or thousands of infrastructure elements 140.

An infrastructure element 140 is typically stationary, i.e., fixed to and not able to move from a specific physical location. The infrastructure sensors 145 may include one or more sensors such as described above for the vehicle 105 sensors 115, e.g., LIDAR, radar, cameras, ultrasonic sensors, etc. The infrastructure sensors 145 are fixed or stationary. That is, each infrastructure sensor 145 is mounted to the infrastructure element 140 so as to have a substantially unmoving and unchanging field of view.

Infrastructure sensors 145 thus provide field of views in contrast to vehicle 105 sensors 115 in a number of advantageous respects. First, because infrastructure sensors 145 have a substantially constant field of view, determinations of vehicle 105 and object locations can be accomplished with fewer and simpler processing resources than if movement of the infrastructure sensors 145 also had to be accounted for. Further, the infrastructure sensors 145 include an external perspective of the vehicle 105 and can sometimes detect features and characteristics of objects not in the vehicle 105 sensors 115 field(s) of view and/or can provide more accurate detection, e.g., with respect to vehicle 105 location and/or movement with respect to other objects. Yet further, infrastructure sensors 145 can communicate with the infrastructure element 140 computer 155 via a wired connection, whereas vehicles 105 typically can communicates with infrastructure elements 140 only wirelessly, or only at very limited times when a wired connection is available. Wired communications are more reliable and can be faster than wireless communications such as vehicle-to-infrastructure communications or the like.

The communications module 150 and computer 155 typically have features in common with the vehicle computer 110 and vehicle communications module 130, and therefore will not be described further to avoid redundancy. Although not shown for ease of illustration, the infrastructure element 140 also includes a power source such as a battery, solar power cells, and/or a connection to a power grid.

The remote server computer 160 can be a conventional computing device, i.e., including one or more processors and one or more memories, programmed to provide operations such as disclosed herein. Further, the remote server computer 160 can be accessed via the network 135, e.g., the Internet, a cellular network, and/or or some other wide area network.

A target vehicle 165 may include a second computer 170. The second computer 170 includes a second processor and a second memory such as are known. The second memory includes one or more forms of computer-readable media, and stores instructions executable by the second computer 170 for performing various operations, including as disclosed herein.

Additionally, the target vehicle 165 may include sensors, actuators to actuate various vehicle components, and a vehicle communications module. The sensors, actuators to actuate various vehicle components, and the vehicle communications module typically have features in common with the sensors 115, actuators 120 to actuate various host vehicle components 125, and the vehicle communications module 130, and therefore will not be described further to avoid redundancy.

Figure 2:
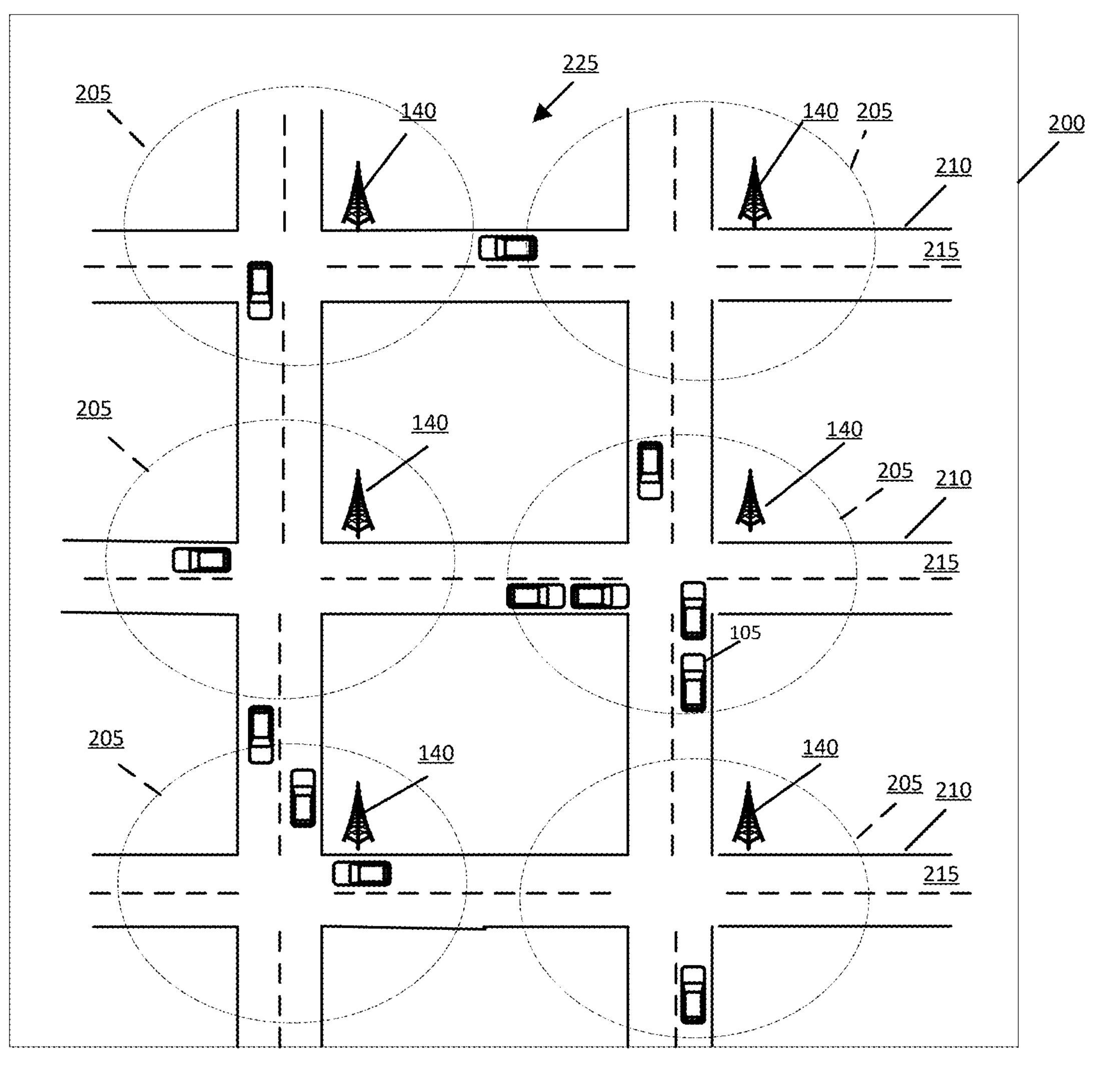
FIG. 2 is a diagram illustrating example areas within an example region in which the system of FIG. 1 would be implemented.

FIG. 2 is a diagram illustrating an example region 200. A region 200 is defined for an infrastructure 225. The infrastructure 225 includes a plurality of infrastructure elements 140 in communication with each other, e.g., via the network 135. The plurality of infrastructure elements 140 are provided to monitor the region 200 around the infrastructure elements 140, as shown in FIG. 2. The region 200 may be, e.g., a neighborhood, a district, a city, a county, etc., or some portion thereof. The region 200 could alternatively be an area defined by a radius encircling the plurality of infrastructure elements 140 or some other distance or set of distances relative to the plurality of infrastructure elements 140.

In addition to vehicles 105, a region 200 can include other objects, e.g., a bicycle object, a pole object etc., i.e., a region 200 could alternatively or additionally include many other objects, e.g., bumps, potholes, curbs, berms, fallen trees, litter, construction barriers or cones, etc. Objects can be specified as being located according to a coordinate system for an area maintained by the vehicle computer 110 and/or infrastructure 140 computer 155, e.g., according to a Cartesian coordinate system or the like specifying coordinates in the region 200. Additionally, data about an object could specify characteristics of an object in a sub-region such as on or near a road, e.g., a height, a width, etc.

The region 200 includes one or more roads 210 each having a lane 215. A lane is a specified area of the road for vehicle travel. A road in the present context is an area of ground surface that includes any surface provided for land vehicle travel. A lane of a road is an area defined along a length of a road, typically having a width to accommodate only one vehicle, i.e., such that multiple vehicles can travel in a lane one in front of the other, but not abreast of, i.e., laterally adjacent, one another.

The region 200 include one or more areas 205, as shown in FIG. 2. Each infrastructure element 140 in the region 200 is provided along one or more roads 210 within the region 200 and/or is positioned to monitor one respective areas 205. Operation data for a portion of a road 210 within the area 205 differs from operation data for a portion of the road 210 outside of the area 205. That is, vehicle operation within the area 205 differs from vehicle operation outside of the area 205, e.g., due to vehicle operation rules within the area 205 differing from vehicle operation rules outside of the area 205. Each area 205 is a subset that is of interest or focus for a particular traffic analysis, e.g., an intersection, a school zone, a railroad crossing, a construction zone, a crosswalk, etc., of the region 200, as shown in FIG. 4. An area 205 is proximate to a respective infrastructure element 140. In the present context, "proximate" means that the area 205 is defined by a field of view of the infrastructure element 140 sensor 145. The area 205 could alternatively be an area defined by a radius around the respective infrastructure element 140 or some other distance or set of distances relative to the respective infrastructure element 140.

Figure 3A:
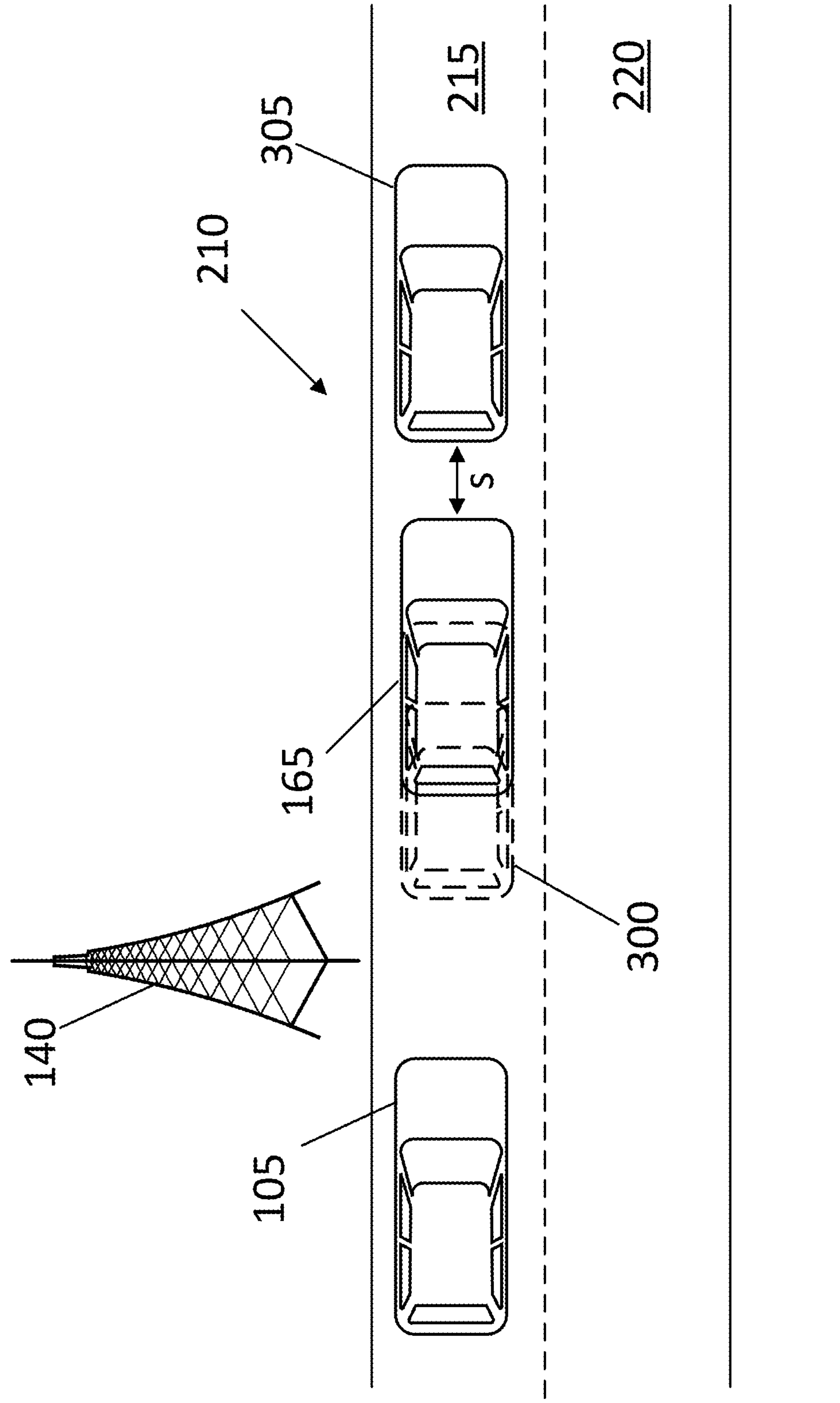
FIGS. 3A-3C are diagrams illustrating an example of a host vehicle operating in a lane of a road.
Figure 3B:
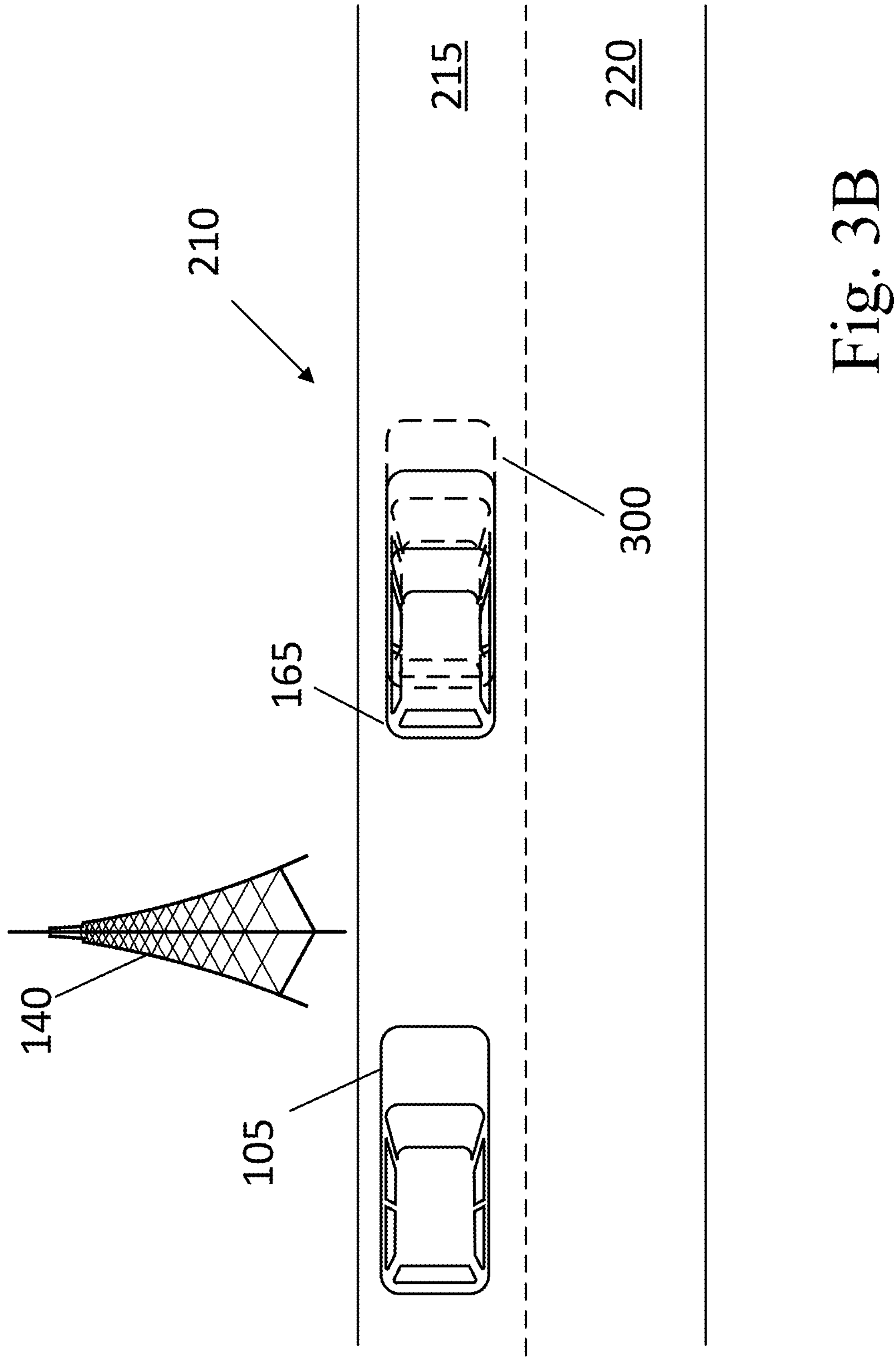
Figure 3C:
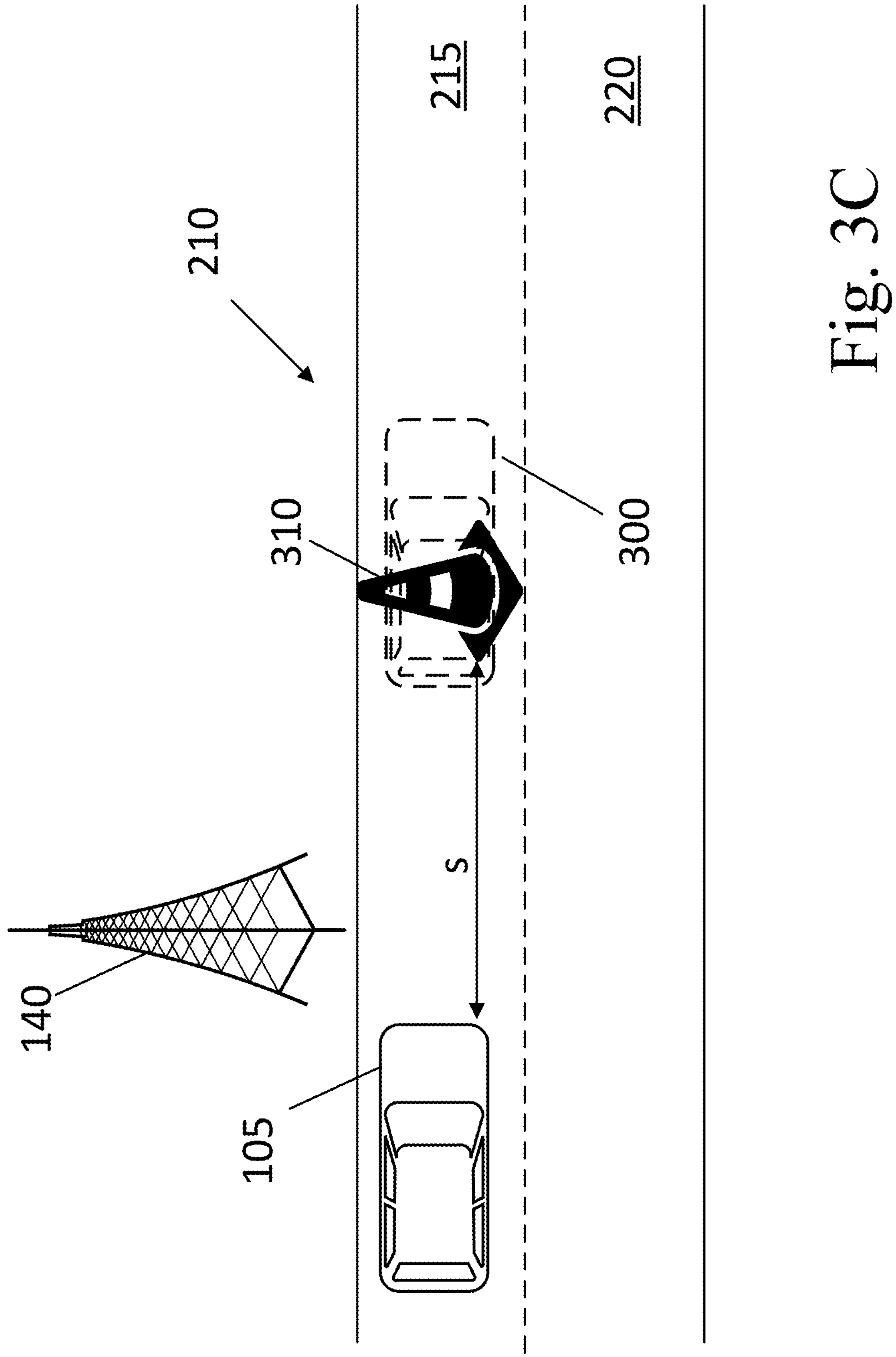

FIGS. 3A-3C are diagrams illustrating a host vehicle 105 operating in a host lane 215 of an example road 210 within the region 200. The vehicle computer 110 may be programmed to transition a cruise control mode between a disabled state and an enabled state based on receiving a user input selecting the cruise control mode, e.g., via a human-machine interface (HMI) such as knobs, buttons, switches, pedals, levers, touchscreens, and/or microphones, etc. Upon enabling the cruise control mode, the vehicle computer 110 is programmed to compare a longitudinal speed, i.e., a speed in a direction along the length of a lane, of the vehicle 105 to a pre-set longitudinal vehicle speed, i.e., a target speed for operation of the host vehicle 105. For example, the vehicle computer 110 can determine the longitudinal speed of the host vehicle 105 based on sensor 115 data, such as wheel speed sensor 115 data. The target vehicle speed may be specified based on a user input received, e.g., via the HMI, after the vehicle computer 110 transitions the cruise control mode to the enabled state.

When the cruise control mode is enabled, the vehicle computer 110 may be programmed to identify a host lane 215, i.e., a lane in which the host vehicle 105 is operating, and one or more second lanes 220, i.e., a lane in which the host vehicle 105 is not operating, on the road 210. For example, the vehicle computer 110 can receive map data and/or location data, e.g., GPS data, from the remote server computer 160 and/or the infrastructure element 140 specifying the host lane 215 and the second lane(s) 220. As another example, the vehicle computer 110 may identify the host lane 215 and the second lane(s) 220 based on sensor 115 data. That is, the vehicle computer 110 can be programmed to receive sensor 115 data, typically, image data, from sensors 115 and to implement various image processing techniques to identify the host lane 215 and the second lane(s) 220. For example, lanes can be indicated by markings, e.g., painted lines on the road 210, and image recognition techniques, such as are known, can be executed by the vehicle computer 110 to identify the host lane 215. For example, the vehicle computer 110 can identify solid lane markings on opposite sides of the host vehicle 105. The vehicle computer 110 can then identify the host lane 215 of host vehicle 105 operation based on a number of groups of dashed lane markings between each side of the host vehicle 105 and the respective solid lane marking. A solid lane marking is a marking extending continuously, i.e., is unbroken, along a length of a road and defining at least one boundary of a lane. A group of dashed lane markings includes a plurality of markings spaced from each other along a length of a road and defining at least one boundary of a lane. Additionally, the vehicle computer 110 can determine the second lane(s) 220 on each side of the host lane 215 based on the number of groups of dashed lane markings on each side of the host vehicle 105 (e.g., a number of second lanes is equal to the number of groups of dashed lane markings).

The vehicle computer 110 is programmed to operate the host vehicle 105 at or below the pre-set longitudinal speed when the cruise control mode is enabled. That is, the vehicle computer 110 adjusts the longitudinal speed and/or acceleration of the host vehicle 105 based on one or more objects around the host vehicle 105. As one example, the vehicle computer 110 can operate the host vehicle 105 based on determining a presence or an absence of a target vehicle 165 in the host lane 215. That is, the vehicle computer 110 can adjust the longitudinal speed and/or acceleration of the host vehicle 105 based on a presence or an absence of a target vehicle 165 within an operating distance of the host vehicle 105. A target vehicle 165 is a vehicle operating in the host lane 215 and forward of the host vehicle 105. The operating distance specifies a minimum distance between the host vehicle 105 and the target vehicle 165 at which the vehicle computer 110 can operate the host vehicle 105. The operating distance may be determined empirically, e.g., based on determining via testing and/or simulation a distance at which the vehicle computer 110 can control the host vehicle 105 to account for the target vehicle 165 (e.g., based on a longitudinal speed of the host vehicle 105, a longitudinal speed of the target vehicle 165, etc.).

To detect the presence or absence of the target vehicle 165, the vehicle computer 110 can receive sensor 115 data, e.g., image data, of the environment around the host vehicle 105. The image data can include one or more vehicles traveling on the road 210 around the host vehicle 105. For example, object classification or identification techniques, can be used, e.g., in the vehicle computer 110 based on lidar sensor 115, camera sensor 115, etc., data to identify a type of object, e.g., a vehicle, a bicycle, a drone, etc., as well as physical features of objects.

Various techniques such as are known may be used to interpret sensor 115 data and/or to classify objects based on sensor 115 data. For example, camera and/or lidar image data can be provided to a classifier that comprises programming to utilize one or more conventional image classification techniques. For example, the classifier can use a machine learning technique in which data known to represent various objects, is provided to a machine learning program for training the classifier. Once trained, the classifier can accept as input vehicle sensor 115 data, e.g., an image, and then provide as output, for each of one or more respective regions of interest in the image, an identification and/or a classification (i.e., movable or non-movable) of one or more objects or an indication that no object is present in the respective region of interest. Further, a coordinate system (e.g., polar or cartesian) applied to an area proximate to the host vehicle 105 can be used to specify locations and/or areas (e.g., according to the host vehicle 105 coordinate system, translated to global latitude and longitude geo-coordinates, etc.) of objects identified from sensor 115 data. Yet further, the vehicle computer 110 could employ various techniques for fusing (i.e., incorporating into a common coordinate system or frame of reference) data from different sensors 115 and/or types of sensors 115, e.g., lidar, radar, and/or optical camera data.

Upon identifying the type of object as a vehicle, the vehicle computer 110 is programmed to identify the vehicle as the target vehicle 165 based on a longitudinal position of the vehicle and a lane of vehicle operation. For example, the classifier can be further trained with data known to represent various longitudinal positions and lanes of operation. Thus, in addition to identifying the object as a vehicle, the classifier can output an identification of a target vehicle 165 based on the longitudinal position and the lane of vehicle operation. Once trained, the classifier can accept as input host vehicle sensor 115 data, e.g., an image, and then provide as output for each of one or more respective regions of interest in the image, an identification of a target vehicle 165 based on the vehicle being forward of the host vehicle 105 and operating in the host lane 215, or that no target vehicle 165 is present in the respective region of interest based on detecting no vehicle forward of the host vehicle 105 and operating in the host lane 215.

The vehicle computer 110 may determine the longitudinal position of a detected vehicle based on sensor 115 data. For example, the vehicle computer 110 may determine a detected vehicle is forward of the host vehicle 105 based on image data from a forward-facing camera. Forward of the host vehicle 105 means that a rearmost point of the identified vehicle is forward of a frontmost point of the host vehicle 105. As another example, the first computer 110 may determine the detected vehicle is rearward of the host vehicle 105 based on image data from a rear-facing camera. Rearward of the host vehicle 105 means that a frontmost point of the identified vehicle is rearward of a rearmost point of the host vehicle 105. As yet another example, the first computer 110 may determine the detected vehicle is next to the host vehicle 105 based on image data from a side-facing camera. Next to the host vehicle 105 means any point of the identified vehicle is between the frontmost point and the rearmost point of the host vehicle 10.

The vehicle computer 110 may be programmed to determine a lane of operation for an identified vehicle based on sensor 115 data. For example, the vehicle computer 110 may determine the lane of operation of the identified vehicle by using image data to identify lane markings on each side of the identified vehicle, e.g., according to image processing techniques, as discussed above. In such an example, the first computer 110 can determine the identified vehicle is in the host lane 215 when the number of lanes on each side of the identified vehicle is the same as the number of lanes on the respective side of the host vehicle 105. As another example, the vehicle computer 110 may receive location data from the identified vehicle, e.g., via V2V communications, specifying the lane of operation of the identified vehicle.

Upon determining the absence of target vehicle 165, the vehicle computer 110 can operate the host vehicle 105 at the pre-set longitudinal speed in the host lane 215. Upon determining the presence of the target vehicle 165, the vehicle computer 110 is programmed to represent the target vehicle 165 with a virtual vehicle 300 (see FIG. 3A). For example, the vehicle computer 110 can associate the virtual vehicle 300 with a location of the target vehicle 165, e.g., received from the infrastructure element 140. In such an example, the vehicle computer 110 can overlay the virtual vehicle 300 onto a representation of the target vehicle 165 in image data. A virtual vehicle is a computer model of a vehicle that includes mathematical data regarding shapes and textures corresponding to the exterior surfaces of the vehicle. For example, a virtual vehicle can be based on a computer aided design (CAD) file that includes geometric mesh data that describes the vehicle in three dimensions at resolution and detail sufficient to be used to manufacture the parts that comprise the vehicle. The mathematical data included in the virtual vehicle can be used to generate a two-dimensional image of the vehicle from a selected point of view. The virtual vehicle can comprise the same real-world dimensions as the vehicle.

Because the virtual vehicle includes a 3D description of the vehicle's exterior surfaces, software executing on the vehicle computer 110 can select a camera intrinsic matrix and represent a virtual vehicle by rendering an image of the virtual vehicle that appears as if a real-world camera had acquired an image of a real-world vehicle. A camera intrinsic matrix includes camera parameters that determine the size, shape and locations of objects in an image and can include sensor size, focal distance, lens magnification and camera six-axis location and orientation with respect to the virtual vehicle.

The vehicle computer 110 may store, e.g., in a memory thereof, a library of virtual vehicles corresponding to various makes and models. The library of virtual vehicles can be generated from CAD files corresponding to each make and model of vehicle, for example. In such an example, in addition to identifying the object as a vehicle, the classifier can output a make and a model of the vehicle. The vehicle computer 110 can then access the library to select the virtual vehicle 305 that corresponds to the make and model of the target vehicle 165.

The vehicle computer 110 is further programmed to predict acceleration for the target vehicle 165. For example, the vehicle computer 110 can receive, from the infrastructure element 140, e.g., via V2X communications, operation data for the road 210. The infrastructure computer 155 (or the remote server computer 160) can determine operation data for the road 210. In this context, "operation data" are data describing movement and positions of vehicles relative to each other, i.e., operation data are data measuring various vehicle attributes as the vehicle operates in the area. The operation data can include, e.g., vehicle speed data, vehicle acceleration, vehicle braking data, vehicle turning data, etc. That is, as vehicles operate on the road 210, the operation data provide measurements describing how the vehicles operate on the road 210.

The operation data can include operating parameters for vehicles, e.g., the host vehicle 105, the target vehicle 165, a lead vehicle 305, etc. operating on the road 210. A lead vehicle 180 is a vehicle operating in the host lane 215 and forward of the target vehicle 165. An operating parameter herein is a physical limit of vehicle 105, 165, 305 operation, i.e., an operating parameter specifies a limit of a measurement of vehicle operation and/or a measurement of an environmental condition limiting vehicle 105, 165, 305 operation. Put another way, an operating parameter is a limit of a measurement of a physical characteristic of a vehicle 105, 165, 305 or an environment around that vehicle 105, 165, 305 while the vehicle 105, 165, 305 operating on the road 210. A variety of operating parameters may be determined for vehicle operation. A non-limiting list of operating parameters includes a speed of the vehicle 105 105, 165, 305, a distance between the vehicles 105, 165, 305, an acceleration of the vehicle 105, 165, 305, a position of the vehicle 105, 165, 305 within a road 210 and/or lane 215, a planned path of the vehicle 105, 165, 305, etc.

The infrastructure computer 155 (or the remote server computer 160) can determine the operation data based on infrastructure sensor 145 data. For example, the infrastructure sensor 145 can capture data, e.g., image and/or video data, of the road 210 and transmit the data to the infrastructure computer 155. Video data can be in digital format and encoded according to conventional compression and/or encoding techniques, providing a sequence of frames of image data where each frame can have a different index and/or represent a specified period of time, e.g., 10 frames per second, and arranged in a sequence. The infrastructure computer 155 can then, for example, analyze the infrastructure sensor 145 data, e.g., using pattern recognition and/or image analysis techniques, to determine the operation data for the area 205. The infrastructure computer 155 can be programmed to transmit the operation data to the server 160, e.g., via the network 135. As another example, the infrastructure computer 155 can provide the infrastructure sensor 145 data to the remote server computer 160, e.g., via the network 135, and the remote server computer 160 can analyze the infrastructure sensor 145 data, e.g., using pattern recognition and/or image analysis techniques, to determine the operation data for the road 210.

Additionally, or alternatively, the infrastructure computer 155 (or the remote server computer 160) can determine the operation data based on aggregated data. Aggregated data means data from a plurality of vehicle computers 110 that provide messages that is combined arithmetically and/or mathematically, e.g., by averaging and/or using some other statistical measure. That is, the infrastructure computer 155 (or the remote server computer 160) may be programmed to receive messages from a plurality of vehicle computers 110 indicating operating parameters for the respective vehicles 105, e.g., determined based on vehicle 105 sensor 115 data. Based on the aggregated data indicating the operating parameters for the vehicles 105 on the road 210 (e.g., an average number of messages, a percentage of messages, etc., indicating the operation data), and taking advantage of the fact that messages from different vehicles 105 are provided independently of one another, the infrastructure computer 155 (or the remote server computer 160) can determine the operation data for the road 210 based on the vehicle 105 sensor 115 data. The infrastructure computer 155 (or the remote server computer 160) can then transmit the operation data to a plurality of vehicles, including the vehicle 105, e.g., via the network 135.

Based on the operating parameters for the target vehicle 165 and the lead vehicle 305, the vehicle computer 110 can predict acceleration for the target vehicle 165 according to Equation 1:

$$a1 = \frac{v_1^2 - v_2^2}{2s} \tag{1}$$

where a1 is a predicted acceleration of the target vehicle 165, s is a longitudinal distance along the road 210 from the target vehicle 165 to the lead vehicle 300, $v_1$ is a longitudinal speed of the target vehicle 165, and $v_2$ is a longitudinal speed of the lead vehicle 300. The longitudinal distance s, and the longitudinal speeds $v_1$, $v_2$ are each specified in the operation data. The predicted acceleration a1 predicts a rate at which the target vehicle 165 will accelerate/decelerate to adjust the longitudinal speed $v_1$ of the target vehicle 165 to match the longitudinal speed $v_2$ of the lead vehicle 300 while traveling the longitudinal distance s. An actual acceleration of the target vehicle 165 may differ from the predicted acceleration a1. For example, the target vehicle 165 may be operated to delay acceleration/deceleration until the target vehicle 165 has traversed a portion of the longitudinal distance s. In such an example, the actual acceleration/deceleration of the target vehicle 165 may be at a higher rate than the predicted acceleration a1.

Upon predicting the acceleration a1 of the target vehicle 165, the vehicle computer 110 can determine an adjustment to a speed $v_{vt}$ for the virtual vehicle 300 according to Equation 2:

$$v_{vt} = v_1 + a_1 dt \tag{2}$$

where dt is a timestep that can be determined empirically, e.g., based on testing and/or simulation that allows for determining an amount of time that facilitates a constant rate (at least as experienced by a vehicle occupant) of adjustment to a vehicle speed. The timestep dt may be stored, e.g., in a memory of the vehicle computer 110.

The vehicle computer 110 is then programmed to simulate operation of the virtual vehicle based on the adjustment to the speed $v_{vt}$. For example, the vehicle computer 110 can input various operating parameters of the target vehicle 165 into a vehicle dynamics model. The "vehicle dynamics model" is a kinematic model describing vehicle motion that outputs distances between the target vehicle 165 and the host vehicle 105 according to various operating parameters. By inputting the virtual vehicle 300 to the vehicle dynamics model, the vehicle computer 110 can obtain data specifying distances between the virtual vehicle 300 and the host vehicle 105 while operating the virtual vehicle 300 at various longitudinal speeds. That is, the vehicle computer 110 can simulate operation of the virtual vehicle 300 with various longitudinal speeds. In this situation, the vehicle computer 110 can determine a simulated distance between the virtual vehicle 300 and the host vehicle 105 based on simulating operation of the virtual vehicle 300 according to the adjustment to the speed $v_{vt}$.

The vehicle computer 110 can determine a distance between the host vehicle 105 and the target vehicle 165 based on the operation data. For example, the vehicle computer 110 can receive the operation data from the infrastructure element, e.g., via V2X communications, as discussed above. The operation data can specify the distance between the host vehicle 105 and the target vehicle 165. As another example, the vehicle computer 110 can determine the distance between the host vehicle 105 and the target vehicle 165 based on sensor 115 data. For example, a lidar sensor 115, which is similar to a radar sensor 115, uses laser light transmissions (instead of radio transmissions) to obtain reflected light pulses from objects, e.g., the target vehicle 165. The reflected light pulses can be measured to determine object distances. Data from the lidar sensor 115 can be provided to generate a three-dimensional representation of detected objects, sometimes referred to as a point cloud.

The vehicle computer 110 can then operate the host vehicle 105 based on a position of the virtual vehicle 300 relative to the host vehicle 105 and the target vehicle 165. Upon determining that the distance is greater than the simulated distance, the vehicle computer 110 can determine that the virtual vehicle 300 is, at least partially, between the host vehicle 105 and the target vehicle 165 (see FIG. 3A). In this situation, the vehicle computer 110 is programmed to operate the host vehicle 105 based on the virtual vehicle 300. Specifically, the vehicle computer 110 can operate the host vehicle 105, i.e., adapt the longitudinal speed of the host vehicle 105, such that the simulated distance output from the vehicle dynamics model is greater than or equal to the operating distance. In this situation, the vehicle computer 110 may operate the host vehicle 105 at a longitudinal speed that is less than the pre-set longitudinal speed.

Upon determining that the distance is less than or equal to the simulated distance, the vehicle computer 110 can determine that the target vehicle 165 is, at least partially, between the host vehicle 105 and the virtual vehicle 300 (see FIG. 3B). In this situation, the vehicle computer 110 is programmed to operate the host vehicle 105 based on the target vehicle 165. Specifically, the vehicle computer 110 can operate the host vehicle 105 to maintain at least the operating distance between the host vehicle 105 and the target vehicle 165. That is, the vehicle computer 110 may adapt the longitudinal speed of the host vehicle 105 based on a longitudinal speed of the target vehicle 165. In this situation, the vehicle computer 110 may operate the host vehicle 105 at a longitudinal speed that is less than the pre-set longitudinal speed.

Turning now to FIG. 3C, additionally or alternatively, in the cruise control mode, the vehicle computer 110 can operate the host vehicle 105 based on determining a presence or an absence of a stationary object 310 in the host lane 215 in front of the host vehicle 105. The vehicle computer 110 may determine that the object 310 is stationary based on sensor 115 data, e.g., image data. For example, the vehicle computer 110 can employ conventional image analysis or pattern recognition techniques to analyze the image data and identify a stationary object 310, e.g., a traffic cone, a non-traversable obstacle, a fallen tree, a constructions barrier, etc.

Upon determining that the object is stationary, the vehicle computer 110 may be programmed to determine a lane of occupation, i.e., a lane in which the stationary object 310 is present, based on sensor 115 data. For example, the vehicle computer 110 may determine the lane of occupation of the stationary object 310 by using image data to identify lane markings on each side of the stationary object, e.g., according to image processing techniques, as discussed above. In such an example, the vehicle computer 110 can determine the stationary object 310 is present in the host lane 215 when the number of lanes on each side of the stationary object 310 is the same as the number of lanes on the respective side of the host vehicle 105. As another example, the vehicle computer 110 may receive sensor 145 data from the infrastructure element 140, e.g., via V2X communications, specifying the lane of occupation of the stationary object 310.

Upon determining the absence of the stationary object 310 in the host lane 215, e.g., no stationary object 310 is present on the road 210, or a lane of occupation for the stationary object 310 is a second lane 220, the vehicle computer 110 can operate the host vehicle 105 at the pre-set longitudinal speed in the host lane 215. Upon determining the presence of the stationary object 310 in the host lane 215, i.e., a lane of occupation for the stationary object 310 is the host lane 215, the vehicle computer 110 may be programmed to represent the stationary object 310 with the virtual vehicle 300. For example, the vehicle computer 110 can associate the virtual vehicle 300 with a location of the stationary object 310, as discussed above with respect to representing the target vehicle 165 with the virtual vehicle 300. The vehicle computer 110 may receive the location of the stationary object 310 from the infrastructure element 140, e.g., via V2X communications. That is, the location of the stationary object 310 may be specified in the operation data for the road 200. In this situation, the vehicle computer 110 can select any one of the virtual vehicles 300 to represent the stationary object, e.g., the virtual vehicle 300 that has a same make and model as the host vehicle 105.

The vehicle computer 110 can then determine the adjustment for the speed $v_{vt}$ for the virtual vehicle 300 based on Equations 1 and 2 above. In this situation, a1 is a target acceleration of the virtual vehicle 300, s is a longitudinal distance along the road 210 from the host vehicle 105 to the location of the stationary object 310, $v_1$ is a longitudinal speed of the host vehicle 105, and $v_2$ is a longitudinal speed of the stationary object 310, i.e., a null value.

The vehicle computer 110 can then be programmed to simulate operation of the virtual vehicle 300 based on the adjustment to the speed $v_{vt}$ to determine the simulated distance, as discussed above. Upon determining the simulated distance, the vehicle computer 110 is programmed to operate the host vehicle 105 based on the virtual vehicle 300. Specifically, the vehicle computer 110 can operate the host vehicle 105, i.e., adapt the longitudinal speed of the host vehicle 105, such that the simulated distance output from the vehicle dynamics model is greater than or equal to the operating distance. In this situation, the vehicle computer 110 stops the host vehicle 105 prior to reaching the location of the stationary object 310.

Figure 4A:
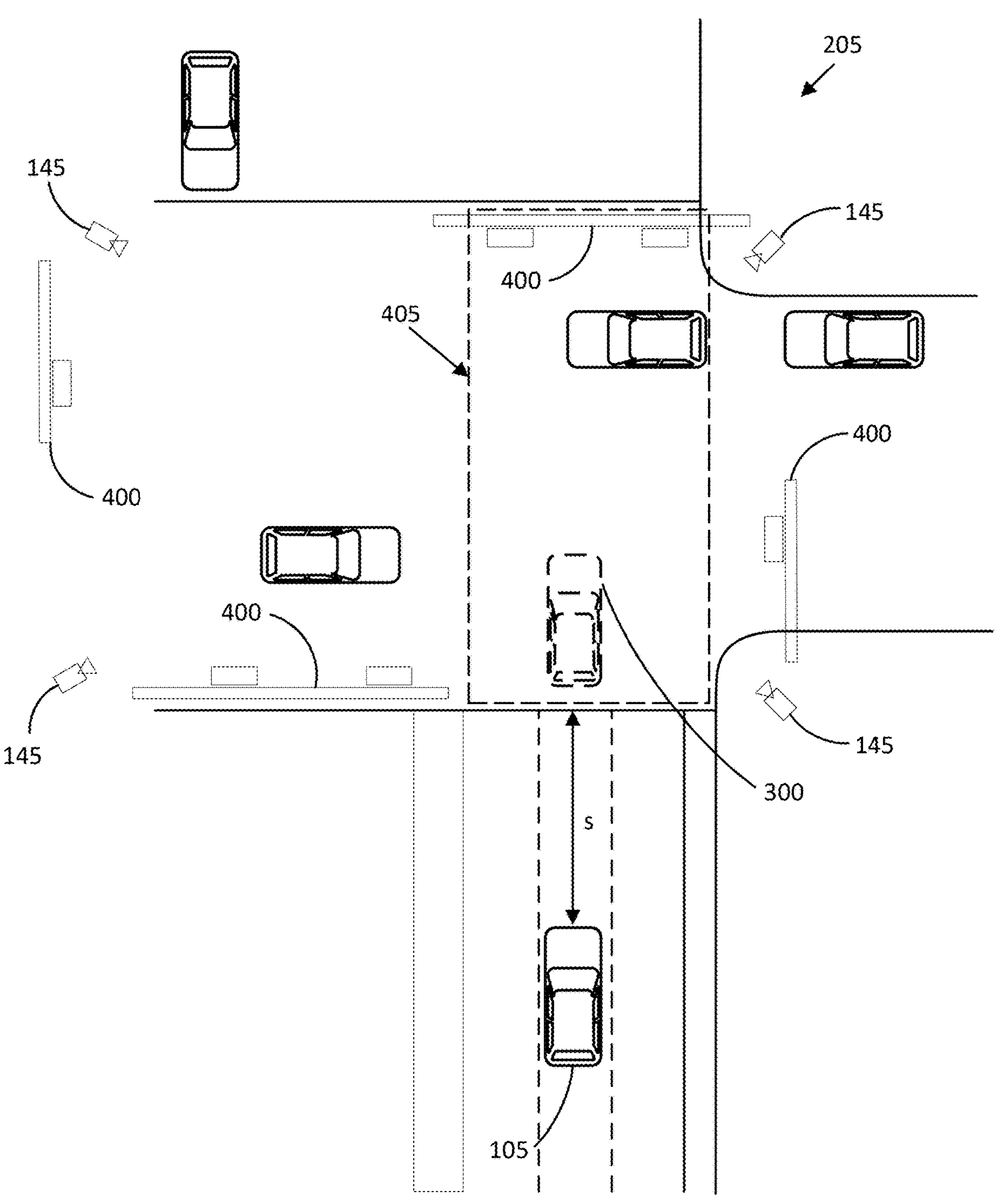
FIG. 4A is a diagram illustrating an example stop area within an exemplary area of FIG. 2 at which the system of FIG. 1 would be implemented.

Turning now to FIG. 4A, additionally, or alternatively, upon determining the absence of the target vehicle 165, the vehicle computer 110 can operate the host vehicle 105 in the cruise control mode based on determining a presence or an absence of a stop area in an area 205 in front of the host vehicle 105. A stop area 405 is a subset of the area 205 at which the host vehicle 105 will stop prior to entering, e.g., an intersection.

The vehicle computer 110 is programmed to determine that the vehicle 105 is operating within the area 205. For example, the vehicle computer 110 can determine that the vehicle 105 is operating within the area 205 based on map data. The vehicle computer 110 can receive the map data of the area 205, e.g., from a remote server computer 160. The map data can, for example, specify a perimeter of the area 205, i.e., a geo-fence. A geo-fence herein has the conventional meaning of a boundary for an area defined by sets of geo-coordinates. The vehicle computer 110 may receive a location of the vehicle 105, e.g., from a sensor 115, a navigation system, a remote server computer 160, etc. The vehicle computer 110 can then compare the location of the vehicle 105 to a geo-fence for the area 205. The vehicle computer 110 can then determine that the vehicle 105 is within the area 205 based on the location of the vehicle 105 indicating the vehicle 105 is within the geo-fence.

As another example, the vehicle computer 110 can determine that the vehicle 105 is operating within the area 205 based on receiving information from the infrastructure computer 155, e.g., via V2X communications. For example, the infrastructure computer 155 may have a communication range that corresponds to a perimeter of the area 205, such that the vehicle computer 110 can communicate with, e.g., detect a message from, the infrastructure computer 155 when the vehicle 105 is within the area 205, but is unable to communicate with, e.g., detect the message from, the infrastructure computer 155 when the vehicle 105 is outside of the area 205. As another example, the vehicle computer 110 can receive infrastructure sensor 145 data from the infrastructure computer 155. In such an example, the infrastructure sensor 145 may have a field of view that includes the area 205. The infrastructure sensor 145 data may include the vehicle 105. The vehicle computer 110 can determine that the vehicle 105 is operating within the area 205 based on detecting the vehicle 105 in the infrastructure sensor 145 data, e.g., by using known object detection and/or identification techniques.

Upon determining that the vehicle 105 is operating within the area 205, the vehicle computer 110 can determine operation data for the area 205. For example, the vehicle computer 110 can receive the operation data for the area 205 from the infrastructure computer 155, e.g., via V2X communications, as discussed above. Additionally, or alternatively, the infrastructure computer 155 (or the remote server computer 160) can provide, to the vehicle computer 105, signal phase and timing data (SPaT) for a traffic signal 400 in the area 205.

For example, the traffic signal 400 may control traffic moving through the area 205 based on the SPaT data. SPaT data indicates a timing of a change of the traffic signal 400 from a current state to a next state. Changing states in this context means changing priorities for vehicles travelling through the area 205, such as, for example, changing a first light signal for a first direction of travel from green to red (reducing the priority for travel in the first direction), and changing the light signal for a second direction of travel from red to green (increasing the priority for travel in the second direction). Said differently, SPaT data indicates which light signal is currently energized and an amount of time until the light signal will no longer be energized and another light signal will be energized. The infrastructure computer 155 can store the SPaT data for the traffic signal 400, e.g., in a memory of the infrastructure computer 155. In such an example, the infrastructure computer 115 can provide the SPaT data to the remote server computer 160. As another example, the remote server computer 160 can store the SPaT data for the traffic signal 400, e.g., in a memory of the remote server computer 160.

The vehicle computer 110 can determine the presence or the absence of the stop area based on the SPaT data for the traffic signal 400. For example, the SPaT data may specify times at which the traffic signal 400 changes states to prioritizes travel in a direction other than a direction of travel of the vehicle 105 and durations until the traffic signal 400 changes states to prioritize travel in a direction of travel of the host vehicle 105. Upon determining that the SPaT data indicates that the traffic signal 400 prioritizes travel in a direction other than the direction of travel of the host vehicle 105, the vehicle computer 110 can determine the presence of the stop area. Upon determining that the SPaT data indicates that the traffic signal 400 prioritizes travel in the direction of travel of the host vehicle 105, the vehicle computer 110 can determine the presence or the absence of the stop area based on Equation 3:

$$s < v_{limit} * t_g \tag{3}$$

where s is a distance along the road from the host vehicle 105 to the area 205, $v_{limit}$ is a maximum longitudinal speed, i.e., a speed limit, permitted for travel along the road 210, $t_g$ is a duration until the traffic signal 400 prioritizes travel in a direction other than the direction of travel of the host vehicle 105. The maximum longitudinal speed $v_{limit}$ may be specified by an entity that maintains and services the road 210 and may be stored, e.g., in a memory of the vehicle computer 110. The vehicle computer 110 can determine the distance s based on sensor 115 data, e.g., lidar data (as discussed above). As another example, the vehicle computer 110 can receive from the infrastructure element 140 monitoring the area 205, e.g., via V2X communications, the maximum longitudinal speed $v_{limit}$ and the distance s. If Equation 3 is satisfied, then the vehicle computer 110 determines the absence of the stop area. If Equation 3 is not satisfied, then the vehicle computer 110 determines the presence of the stop area.

Upon determining the absence of the stop area, the vehicle computer 110 can operate the host vehicle 105 at the pre-set longitudinal speed. Upon determining the presence of the stop area 405, the vehicle computer 110 may be programmed to represent the stop area with the virtual vehicle 300. For example, the vehicle computer 110 can associate the virtual vehicle 300 with a location of the stop area 405, as discussed above with respect to representing the target vehicle 165 with the virtual vehicle 300. The vehicle computer 110 may receive the location of the stop area 405 from the infrastructure element 140, e.g., via V2X communications. That is, the location of the stop area 405 may be specified in the operation data for the road 210. The location of the stop area 405 may specify a location of a boundary extending transversely to a direction of travel of the host vehicle 105 that is first to be crossed by the host vehicle entering the stop area 405 given the direction of travel of the host vehicle 105.

The vehicle computer 110 can determine the adjustment to the speed $v_{vt}$ for the virtual vehicle based on Equation 4:

$$v_{vt} = \sqrt{2at_g(s + d_{current})} \tag{4}$$

where a is an acceleration of the host vehicle 105, and $d_{current}$ is a longitudinal distance along the road 210 from the host vehicle 105 to the stop area 405. The vehicle computer 110 can determine the longitudinal distance $d_{current}$, for example, as a difference between a current location of the host vehicle 105, e.g., specified as geo-coordinates, and a location of a boundary extending transversely to a direction of travel of the host vehicle 105 that is first to be crossed by the host vehicle entering the stop area 405 given the direction of travel of the host vehicle 105. The vehicle computer 110 can determine the acceleration a of the host vehicle 105 based on sensor 115 data. For example, the vehicle computer 110 can determine a longitudinal speed of the host vehicle 105, e.g., via wheel speed sensor 115 data, at multiple instances. The vehicle computer 110 can then determine the acceleration a of the host vehicle 105 as the change in longitudinal speed of the host vehicle 105 ($\Delta v$) over a time step between the instances at which the longitudinal speed of the host vehicle 105 was determined ($\Delta t$). That is, the vehicle computer 110 can determine the acceleration a via $\Delta v/\Delta t$.

The vehicle computer 110 can then be programmed to simulate operation of the virtual vehicle 300 based on the adjustment to the speed $v_{vt}$ to determine the simulated distance, as discussed above. Upon determining the simulated distance, the vehicle computer 110 is programmed to operate the host vehicle 105 based on the virtual vehicle 300. Specifically, the vehicle computer 110 can operate the host vehicle 105, i.e., adapt the longitudinal speed of the host vehicle 105, such that the simulated distance output from the vehicle dynamics model is greater than or equal to the operating distance. In this situation, the vehicle computer 110 stops the host vehicle 105 prior to the host vehicle 105 reaching the location of the stop area.

Figure 4B:
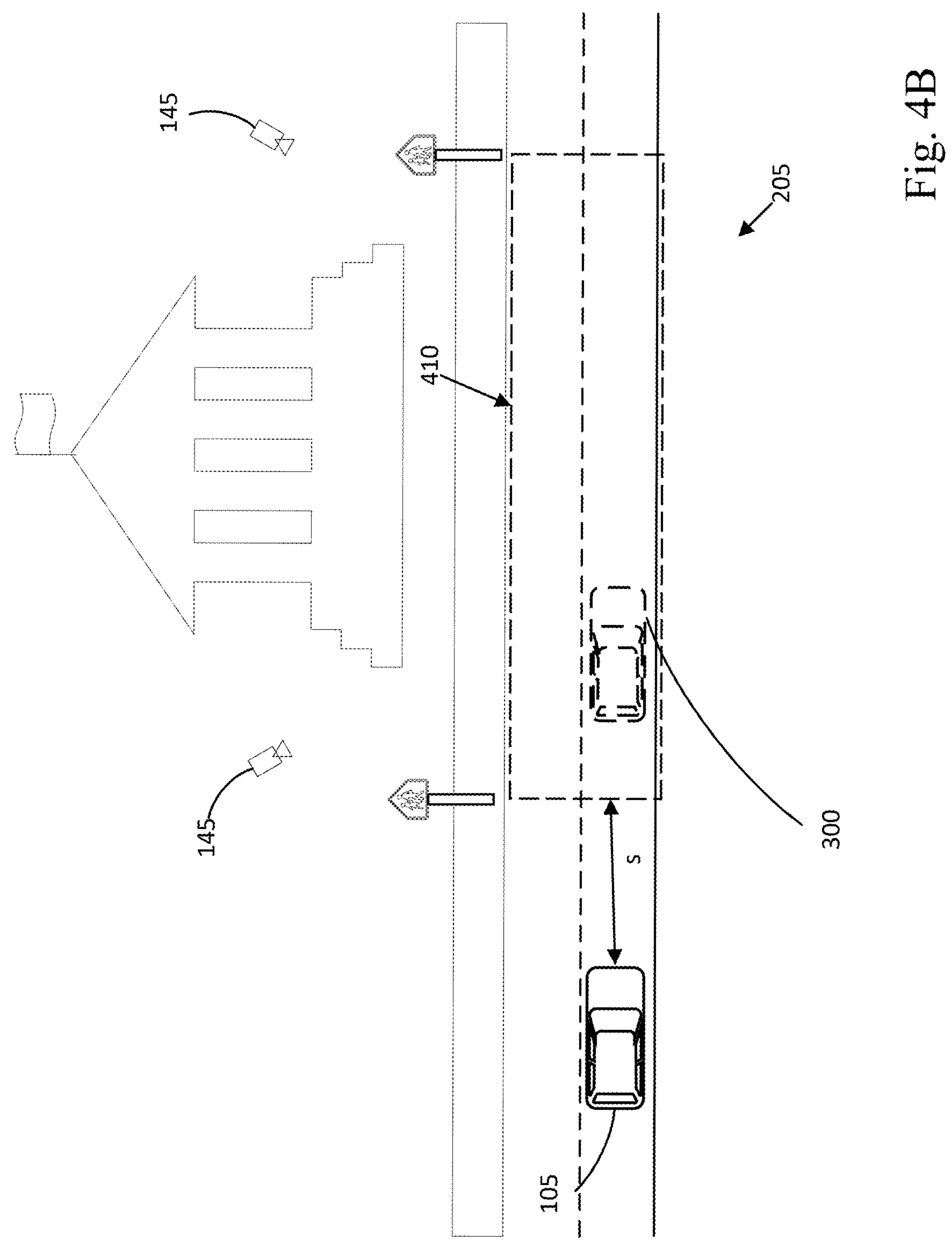
FIG. 4B is a diagram illustrating an example speed reduction area within an exemplary area of FIG. 2 at which the system of FIG. 1 would be implemented.

Additionally or alternatively, and now referring further to FIG. 4B, upon determining the absence of the target vehicle 165, the vehicle computer 110 can operate the host vehicle 105 in the cruise control mode based on determining a presence or an absence of a speed reduction area 410 in an area 205 in front of the host vehicle 105. A speed reduction area is subset that is an area in which vehicle operation differs from vehicle operation outside of the speed reduction area. As an example, the vehicle computer 110 can receive, from the infrastructure element 140 in the area 205, e.g., via V2X communications, operation data indicating that a speed at which vehicles are traveling through the area 205 is less than a specified speed limit for the area 205, e.g., due to a traffic density, i.e., a number of vehicles per unit distance along a length of a road, a presence of a construction zone, specified speed reduction times (e.g., time periods associated with school drop-off/pick-up).

Upon determining the absence of the speed reduction area 410, the vehicle computer 110 can operate the host vehicle 105 at the pre-set longitudinal speed. Upon determining the presence of the speed reduction area 410, the vehicle computer 110 may be programmed to represent the speed reduction area 410 with the virtual vehicle 300. For example, the vehicle computer 110 can associate the virtual vehicle 300 with a location of the speed reduction area 410, as discussed above with respect to representing the target vehicle 165 with the virtual vehicle 300. The vehicle computer 110 may receive the location of the speed reduction area 410 from the infrastructure element 140, e.g., via V2X communications. That is, the location of the speed reduction area 410 may be specified in the operation data for the road 200. The location of the speed reduction area 410 may specify a location of a boundary extending transversely to a direction of travel of the host vehicle 105 that is first to be crossed by the host vehicle entering the speed reduction area 410 given the direction of travel of the host vehicle 105.

The vehicle computer 110 can then determine the adjustment to the speed $v_{vt}$ for the virtual vehicle 300 based on Equations 1 and 2 above. In this situation, a1 is a target acceleration of the virtual vehicle 300, s is a longitudinal distance along the road 210 from the host vehicle 105 to a location of the speed reduction area 410, $v_1$ is a longitudinal speed of the host vehicle 105, and $v_2$ is a longitudinal speed indicated by the speed reduction area 410. The longitudinal speed indicated by the speed reduction area 410 may be specified by operation data.

The vehicle computer 110 can then be programmed to simulate operation of the virtual vehicle 300 based on the adjusted speed $v_{vt}$ to determine the simulated distance, as discussed above. Upon determining the simulated distance, the vehicle computer 110 is programmed to operate the host vehicle 105 based on the virtual vehicle 300. Specifically, the vehicle computer 110 can operate the host vehicle 105, i.e., adapt the longitudinal speed of the host vehicle 105, such that the simulated distance output from the vehicle dynamics model is greater than or equal to the operating distance. In this situation, the vehicle computer 110 may reduce the longitudinal speed of the host vehicle 105 to the speed indicated by the speed reduction area 410 prior to the host vehicle 105 entering the speed reduction area 410.

Figure 5A:
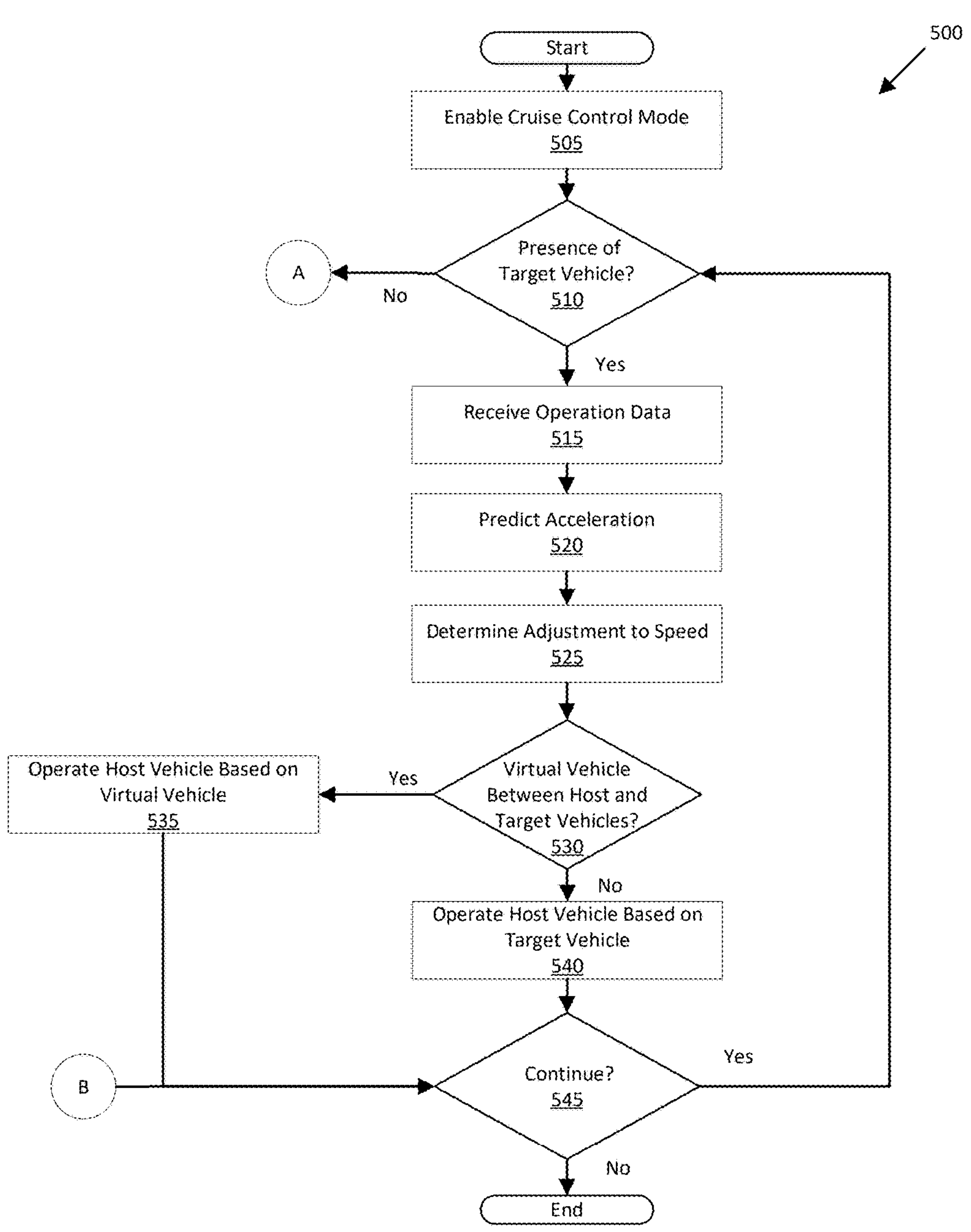
FIG. 5A is a first portion of an example flowchart of an example process for operating a host vehicle.
Figure 5B:
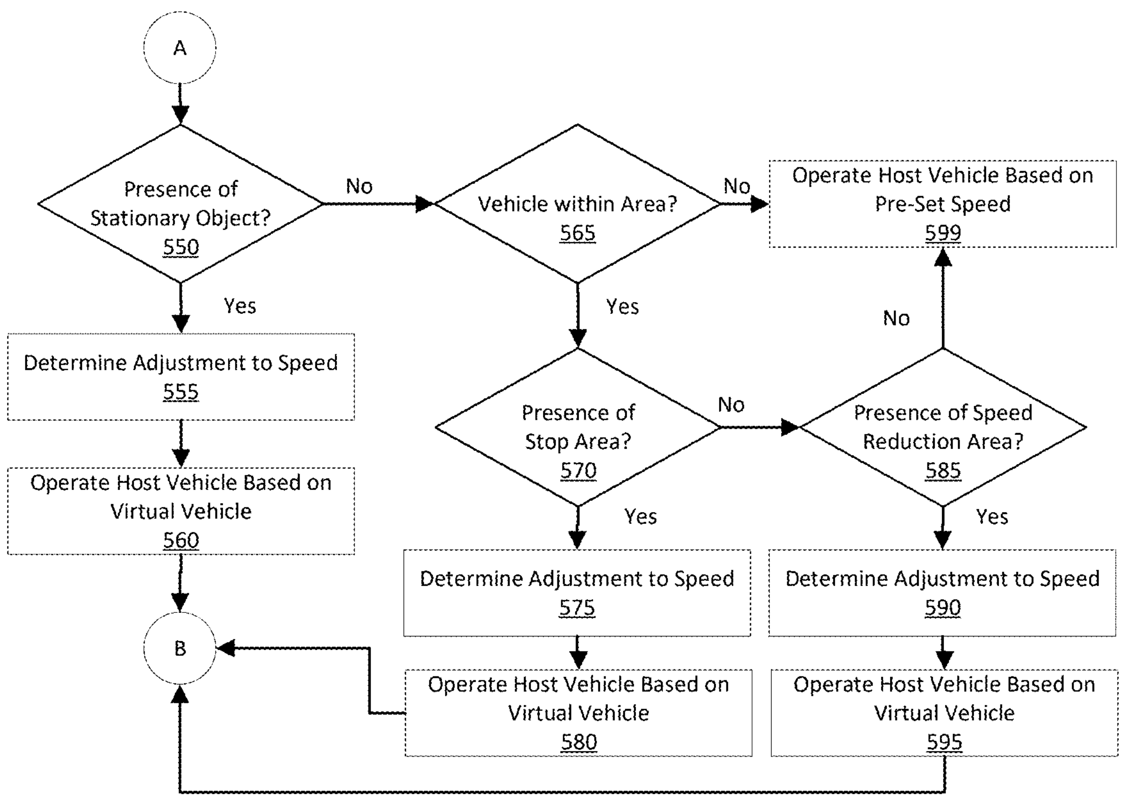
FIG. 5B is a second portion of the flowchart of FIG. 5A.

FIG. 5 is a diagram of an example process 500 for operating a host vehicle 105. The process 500 begins in a block 505. The process 500 can be carried out by a vehicle computer 110 included in the host vehicle 105 executing program instructions stored in a memory thereof.

In the block 505, the vehicle computer 110 enables the cruise control mode, as discussed above. Additionally, the vehicle computer 110 determines a pre-set longitudinal speed, e.g., via a user input, as discussed above. The process 500 continues in a block 510.

In the block 510, the vehicle computer 110 determines a presence or an absence of a target vehicle 165. The vehicle computer 110 determines the presence of the target vehicle based on identifying a vehicle operating in a host lane 215 on a road 210 and forward of the host vehicle 105, as discussed above. If the vehicle computer 110 determines the presence of the target vehicle 165, then the process 500 continues in a block 515. Otherwise, the process 500 continues in a block 550.

In the block 515, the vehicle computer 110 receives operation data for the road 210. The vehicle computer 110 can receive the operation data from an infrastructure element 140, e.g., via V2X communications, as discussed above. The process continues in a block 520.

In the block 520, the vehicle computer 110 predicts acceleration for the target vehicle 165 based on the operation data, as discussed above. The process 500 continues in a block 525.

In the block 525, the vehicle computer 110 determines an adjustment to a speed of the virtual vehicle 300 based on the predicted acceleration for the target vehicle 165, as discussed above. Additionally, the vehicle computer 110 represents the target vehicle 165 with a virtual vehicle 300, as discussed above. The process 500 continues in a block 530.

In the block 530, the vehicle computer 110 determines whether the virtual vehicle 300 is between the host vehicle 105 and the target vehicle 165. For example, the vehicle computer 110 can simulate, via a vehicle dynamics model, operation of the virtual vehicle 300 based on the adjustment to the speed, as discussed above. The vehicle computer 110 can determine a simulated distance between the virtual vehicle 300 and the host vehicle 105 based on the simulated operation, and can determine a distance between the target vehicle 165 and the host vehicle 105 based on sensor 115 data, as discussed above. If the simulated distance is less than the distance, i.e., the virtual vehicle 300 is between the host vehicle 105 and the target vehicle 165, then the process 500 continues in a block 535. Otherwise, the process 500 continues in a block 540.

In the block 535, the vehicle computer 110 operates the host vehicle 105 based on the virtual vehicle 300, as discussed above. The process 500 continues in a block 545.

In the block 540, the vehicle computer 110 operates the host vehicle 105 based on the target vehicle 165, as discussed above. The process 500 continues in the block 545.

In the block 545, the vehicle computer 110 determines whether to continue the process 500. For example, the vehicle computer 110 can determine not to continue when the cruise control mode is disabled, e.g., based on receiving a second user input. Conversely, the vehicle computer 110 can determine to continue when the cruise control mode is enabled, e.g., based on an absence of the second user input. If the vehicle computer 110 determines to continue, the process 500 returns to the block 510. Otherwise, the process 500 ends.

In the block 550, the vehicle computer 110 determines whether a stationary object 310 is determined to be present in a host lane 215 in front of the host vehicle 105. The vehicle computer 110 can determine the presence of the stationary object 310 based on sensor 115 data, as discussed above. If the vehicle computer 110 determines the presence of the stationary object 310, then the process 500 continues in a block 555. Otherwise, the process 500 continues in a block 565.

In the block 555, the vehicle computer 110 determines an adjustment to a speed of the virtual vehicle 300 based on a distance between the host vehicle 105 and a location of the stationary object 310, as discussed above. Additionally, the vehicle computer 110 represents the stationary object 310 with the virtual vehicle 300, as discussed above. The process 500 continues in a block 560.

In the block 560, the vehicle computer 110 operates the host vehicle 105 based on virtual vehicle 300, as discussed above. For example, the vehicle computer 110 can operate the host vehicle 105 such that a simulated distance determined from simulated operation of the virtual vehicle 300 based on the adjustment to the speed determined in the block 555 is greater than or equal to an operating distance, as discussed above. The process 500 continues in the block 545.

In the block 565, the vehicle computer 110 determines whether the host vehicle 105 is operating within an area 205, e.g., based on infrastructure sensor 145 data, map data, etc., as discussed above. If the host vehicle 105 is operating within the area 205, then the process 500 continues in a block 570. Otherwise, the process 500 continues in a block 599.

In the block 570, the vehicle computer 110 determines a presence or an absence of a stop area 410, as discussed above. If the vehicle computer 110 determines the presence of the stop area 405, then the process 500 continues in a block 575. Otherwise, the process 500 continues in a block 585.

In the block 575, the vehicle computer 110 determines an adjustment to the speed of the virtual vehicle 300 based on a distance between the host vehicle 105 and a location of the stop area 405, as discussed above. Additionally, the vehicle computer 110 represents a location of the stop area 405 with the virtual vehicle 300, as discussed above. The process 500 continues in a block 580.

In the block 580, the vehicle computer 110 operates the host vehicle 105 based on virtual vehicle 300, as discussed above. For example, the vehicle computer 110 can operate the host vehicle 105 such that a simulated distance determined from simulated operation of the virtual vehicle 300 based on the adjustment to the speed determined in the block 575 is greater than or equal to the operating distance. The process 500 continues in the block 545.

In a block 585, the vehicle computer 110 determines a presence or an absence of a speed reduction area 410, as discussed above. If the vehicle computer 110 determines the presence of the speed reduction area 410, then the process 500 continues in a block 590. Otherwise, the process 500 continues in a block 599.

In the block 590, the vehicle computer 110 represents a location of the speed reduction area 410 with the virtual vehicle 300, as discussed above. Additionally, the vehicle computer 110 determines an adjustment to the speed of the virtual vehicle 300 based on a distance between the host vehicle 105 and a location of the speed reduction area 410, as discussed above. The process 500 continues in a block 595.

In the block 595, the vehicle computer 110 operates the host vehicle 105 based on virtual vehicle 300, as discussed above. For example, the vehicle computer 110 can operate the host vehicle 105 such that a simulated distance determined from simulated operation of the virtual vehicle 300 based on the adjustment to the speed determined in the block 590 is greater than or equal to the operating distance. The process 500 continues in the block 545.

In the block 599, the vehicle computer 110 operates the host vehicle 105 at the pre-set longitudinal speed, as discussed above. The process 500 continues in the block 545.

Systems and methods described herein may be modified and/or omitted depending on the context, situation, and applicable rules and regulations. Further, regardless actions that may be taken by a vehicle such as a computer controlling vehicle speed and/or acceleration, users should use good judgement and common sense when operating the vehicle. Operations described herein should always be implemented and/or performed in accordance with the owner manual and safety guidelines.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising a computer including a processor and a memory, the memory storing instructions executable by the processor to:

while operating a host vehicle in a lane of a road, represent a target vehicle operating in the lane in front of the host vehicle with a virtual vehicle that comprises a computer model including data about exterior surfaces of the virtual vehicle;

upon receiving, from an infrastructure element, operation data describing vehicle operation for the road, predict acceleration of the target vehicle based on the operation data;

determine an adjustment to a speed for the virtual vehicle based on the acceleration;

update the virtual vehicle based on the adjustment to the speed; and upon determining that the virtual vehicle is between the target vehicle and the host vehicle, operate the host vehicle based on the virtual vehicle.

2. The system of claim 1, wherein the instructions further include instructions to, upon determining that the target vehicle is between the host vehicle and the virtual vehicle, operate the host vehicle based on the target vehicle.

3. The system of claim 1, wherein the instructions further include instructions to, upon determining an absence of the target vehicle, operate the host vehicle based on a pre-set vehicle speed.

4. The system of claim 1, wherein the instructions further include instructions to, upon determining an absence of the target vehicle, determine that the host vehicle is operating within an area of the road, wherein the operation data describing vehicle operation within the area differs from the operation data describing vehicle operation outside the area.

5. The system of claim 4, wherein the instructions further include instructions to determine one of a presence and an absence of a stop area for the host vehicle within the area based on the operation data.

6. The system of claim 5, wherein the instructions further include instructions to:

upon determining the presence of the stop area, determine the adjustment to the speed for the virtual vehicle based on a distance between the host vehicle and a location of the stop area;

represent the virtual vehicle in the lane based on the adjustment to the speed; and operate the host vehicle based on the virtual vehicle.

7. The system of claim 5, wherein the instructions further include instructions to, upon determining the absence of the stop area, operate the host vehicle based on a pre-set vehicle speed.

8. The system of claim 4, wherein the instructions further include instructions to determine one of a presence and an absence of a speed reduction area for the host vehicle within the area based on the operation data.

9. The system of claim 8, wherein the instructions further include instructions to:

upon determining the presence of the speed reduction area, determine the adjustment to the speed for the virtual vehicle based on a distance between the host vehicle and a location of the speed reduction area and a reduced speed associated with the speed reduction area;

represent the virtual vehicle in the lane based on the adjustment to the speed; and operate the host vehicle based on the virtual vehicle.

10. The system of claim 8, wherein the instructions further include instructions to, upon determining the absence of the speed reduction area, operate the host vehicle based on a pre-set vehicle speed.

11. The system of claim 1, wherein the instructions further include instructions to, upon determining an absence of the target vehicle, determine one of a presence and an absence of a stationary object in the lane in front of the host vehicle.

12. The system of claim 11, wherein the instructions further include instructions to:

upon determining the presence of the stationary object, determine the adjustment to the speed for the virtual vehicle based on a distance between the host vehicle and a location of the stationary object;

represent the virtual vehicle in the lane based on the adjustment to the speed; and operate the host vehicle based on the virtual vehicle.

13. The system of claim 11, wherein the instructions further include instructions to, upon determining the absence of the stationary object, operate the host vehicle based on a pre-set vehicle speed.

14. A method, comprising:

while operating a host vehicle in a lane of a road, representing a target vehicle operating in the lane in front of the host vehicle with a virtual vehicle that comprises a computer model including data about exterior surfaces of the virtual vehicle;

upon receiving, from an infrastructure element, operation data describing vehicle operation for the road, predicting acceleration of the target vehicle based on the operation data;

determining an adjustment to a speed for the virtual vehicle based on the acceleration;

updating the virtual vehicle based on the adjustment to the speed; and upon determining that the virtual vehicle is between the target vehicle and the host vehicle, operating the host vehicle based on the virtual vehicle.

15. The method of claim 14, further comprising, upon determining that the target vehicle is between the host vehicle and the virtual vehicle, operating the host vehicle based on the target vehicle.

16. The method of claim 14, further comprising, upon determining an absence of the target vehicle, operating the host vehicle based on a pre-set vehicle speed.

17. The method of claim 14, further comprising, upon determining an absence of the target vehicle, determine that the host vehicle is operating within an area of the road, wherein the operation data describing vehicle operation within the area differs from the operation data describing vehicle operation outside the area.

18. The method of claim 17, further comprising:

determining one of a presence and an absence of a stop area for the host vehicle within the area based on the operation data;

upon determining the presence of the stop area:

determining the adjustment to the speed for the virtual vehicle based on a distance between the host vehicle and a location of the stop area;

representing the virtual vehicle in the lane based on the adjustment to the speed; and operating the host vehicle based on the virtual vehicle; and upon determining the absence of the stop area, operating the host vehicle based on a pre-set vehicle speed.

19. The method of claim 17, further comprising:

determining one of a presence and an absence of a speed reduction area for the host vehicle within the area based on the operation data;

upon determining the absence of the speed reduction area, operating the host vehicle based on a pre-set vehicle speed; and upon determining the presence of the speed reduction area:

determining the adjustment to the speed for the virtual vehicle based on a distance between the host vehicle and a location of the speed reduction area and a reduced speed associated with the speed reduction area;

representing the virtual vehicle in the lane based on the adjustment to the speed; and operating the host vehicle based on the virtual vehicle.

20. The method of claim 14, further comprising:

upon determining an absence of the target vehicle, determining one of a presence and an absence of a stationary object in the lane in front of the host vehicle;

upon determining the presence of the stationary object:

determining the adjustment to the speed for the virtual vehicle based on a distance between the host vehicle and a location of the stationary object;

representing the virtual vehicle in the lane based on the adjustment to the speed; and operating the host vehicle based on the virtual vehicle; and upon determining the absence of the stationary object, operating the host vehicle based on a pre-set vehicle speed.

* * * * *